(No Model.)
W. R. BEAL.
HYDRAULIC MAIN.
No. 265,736. Patented Oct. 10, 1882.
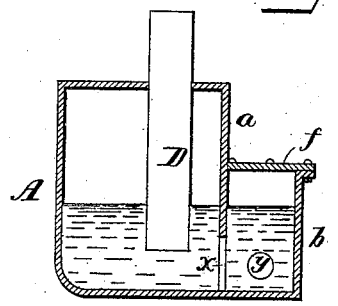
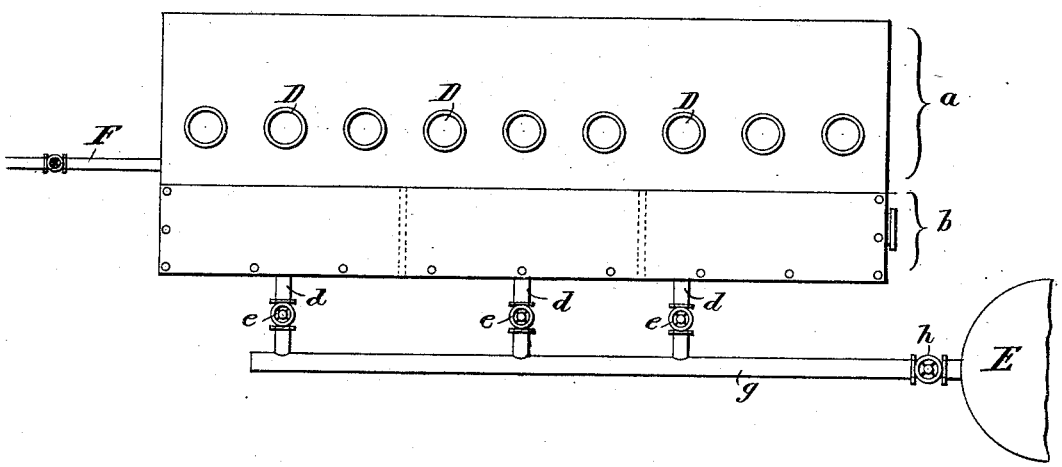
Attest:
Courtney A. Cooper
William Paxton
Inventor:
Wm. R. Beal
By Chas. E. Foster
Atty.

UNITED STATES PATENT OFFICE.

WILLIAM R. BEAL, OF NEW YORK, N. Y.

HYDRAULIC MAIN.

SPECIFICATION forming part of Letters Patent No. 265,736, dated October 10, 1882.

Application filed July 24, 1882. (No model.)

*To all whom it may concern:*

Be it known that I, WILLIAM R. BEAL, of the city, county, and State of New York, have invented Improvements in Hydraulic Mains, of which the following is a specification.

My invention consists of a gas-main constructed, as fully described hereinafter, so as to prevent the interference with the flow of gas resulting from the stopping up of the main by tarry deposits and the necessity of removing the latter.

In the drawings, Figure 1 is a transverse section of a hydraulic main illustrating my improvement, and Fig. 2 is a plan view of the main, showing additional features.

In Letters Patent issued to me August 16, 1881, I describe a mode of preventing the stoppage of hydraulic mains by the use of two communicating chambers, one above the other, and dip-pipes arranged to discharge the tarry matters into the lower chamber, from which they are removed from time to time.

My present invention relates to features not claimed in said patent, and, instead of being limited to chambers placed one above the other, may be embodied in mains having both chambers upon the same plane. Thus the main A has the usual chamber, $a$, of any suitable form and dimensions, and the supplemental chamber $b$, which may be connected to or form part of the main chamber, and may be upon the same plane with or below the latter. The communicating opening or openings $x$ between the two chambers should be as near the bottom of the chamber $a$ as practicable, and the lower ends of each dip-pipe D should extend as near as possible to this opening, so that the tarry matter will flow toward the chamber $b$. The tar and water may be drawn continuously from the chamber $b$ through an opening, $y$, at the end or side thereof, and for this purpose the chamber $b$ may be put in communication with a stand-pipe, E, through a pipe, $d$, provided with a valve, $e$, and a constant stream of water may be admitted to the main through a pipe, F, so as to maintain a current from the main chamber $a$ into and from the supplemental chamber $b$. Such a current, however, is not sufficient to wholly remove the heavier thicker tarry deposits which in time accumulate in the main and must occasionally be removed, the flow of gas in ordinary mains being interrupted during such removal. To permit the cleansing of the main of such hard deposits without interfering with the operation of gas-making, I provide the supplemental chamber with a detachable cover, $f$, secured by bolts or other fastenings, and when necessary remove this cover, clean out the tarry matter from both chambers, and again shut up the chamber without the escape of any gas, the opening $x$ being below the water-level and sealed by the water in the chambers.

To avoid the necessity of opening too great a portion of the main at one time, I may divide it by partitions (shown in dotted lines, Fig. 2,) into sections, and each section of the chamber $b$ may have a separate lid, any one of which may be removed without disturbing the others, and each section may have a separate pipe, $d$, and cock $e$, communicating with a pipe, $g$, leading from all the sections to the stand-pipe, and provided with a cock, $h$. By this means any one section or all may be cut off from the stand-pipe. It is not essential that the chamber $b$ shall communicate with a stand-pipe. It may be closed, except the opening $x$, and the tar removed only through the top.

I claim—

1. A hydraulic main provided with the dip-pipes D and with two communicating chambers, $a\ b$, the chamber $a$ receiving the dip-pipes D and the chamber $b$ having a detachable cover and fastening devices, and communicating with the chamber $a$ opposite each dip-pipe through an opening at the bottom of the chamber $a$ and below the water-level, as set forth.

2. The hydraulic main having a chamber, $a$, and dip-pipes, and a supplemental chamber, $b$, provided with a removable cover, in combination with a stand-pipe, any suitable connections communicating with the chamber $b$, and an inflow water-pipe, F, connecting with the chamber $a$, substantially as set forth.

In testimony whereof I have signed my name to this specification in the presence of two subscribing witnesses.

WM. R. BEAL.

Witnesses:
CHARLES E. FOSTER,
A. BELL.